United States Patent Office 3,340,248
Patented Sept. 5, 1967

3,340,248
GLUCOSYL-STEROID-GUANYL-HYDRAZONES
Karlheinz Meyer, Hans Krätzer, and Siegismund Schütz, Wuppertal-Elberfeld, Kurt Stoepel, Wuppertal-Vohwinkel, and Hans-Günther Kroneberg, Haan, Rhineland, Germany, assignors to Farbenfabriken Bayer Aktiengesellschaft, Leverkusen, Germany, a corporation of Germany
No Drawing. Filed Apr. 13, 1965, Ser. No. 447,896
Claims priority, application Germany, Apr. 16, 1964, F 42,621
29 Claims. (Cl. 260—210.5)

This invention relates to novel cardio-active compounds and their production and more particularly to unsubstituted and substituted steroid-guanyl-hydrazones where the steroid moiety has one or more aliphatic, alicyclic, aromatic or heterocyclic substituents with one or more hydroxyl groups, which can be acylated or etherified, and have one or more keto or aldehyde carbonyl groups which can be present in the novel compounds as free keto or aldehyde carbonyl groups.

The action of aminoguanidine on steroid-ketones which contain only one carbonyl function, has been described in two cases [J. Barnett and C. J. O. R. Morris, Biochemical Journal, 40, 4450 (1946), and M. Pesez, J. Barts, J. Mathien and J. Valls, Bull. Soc. Chim. France, 1958, 488]. In both cases, ketones containing the carbonyl group in the 3- or 17-position were reacted, and the reaction products were used only for physical measurements.

The object of German Patent 1,175,228 is the production of condensation products from steroids with more than one carbonyl function and amino-guanidine or its salts. These condensation products are cardio-active.

It has now been found that cardio-active, i.e. cardiotonic compounds are also obtained, when steroids having one or more aliphatic, alicyclic, aromatic or heterocyclic substituents with one or more hydroxyl groups, which may also be acylated or etherified, and, in addition, one or more keto- or aldehyde-carbonyl groups, are converted into the corresponding substituted or unsubstituted guanyl-hydrazones which may still contain free keto- or aldehyde-carbonyl groups.

As aliphatic substituents of the said type there are to be understood, quite generally, saturated or unsaturated alcohols with one or more hydroxyl groups, where the chain may be interrupted by hetero atoms such as nitrogen, sulphur or oxygen, or substituted by suitable substituents such as alicyclic or aromatic rings, amino groups or halogen atoms.

Alicyclic substituents with one or more hydroxyl groups here comprise alicyclic rings of any size, which can be unsaturated and substituted by suitable substituents such as alkyl, cycloalkyl, aryl, amino, halogen or fused alicyclic rings.

Aromatic substituents with one or more hydroxyl groups here comprise aromatic mono- or poly-cycles which may contain further suitable substituents such as alkyl, cycloalkyl, amino groups and halogen.

Heterocyclic substituents with one or more hydroxyl groups here comprise any heterocycles of any ring size, which contain one or more hetero atoms, such as nitrogen, sulphur or oxygen, in the ring and which may be substituted by suitable radicals such as alkyl, cycloalkyl, aryl and halo-amine and may contain carbonyl groups in the ring (lactone-lactam ring).

The aliphatic, alicyclic, aromatic and heterocyclic substituents with one or more hydroxyl groups described above can be linked to the steroid structure directly or via ether, ester, amide, imino, amino, sulphur, carbonic acid ester and carbamic acid ester groups.

The new compounds are produced according to the invention in that steroids which contain one or more aliphatic, alicyclic, aromatic or heterocyclic substituents with one or more hydroxyl groups, which may also be acylated or etherified, and, in addition, one or more keto- or aldehyde-carbonyl groups, are (a) reacted in a manner per se known with aminoguanidines of the formula:

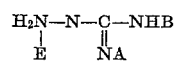

or their salts, or (b) condensed with thiosemicarbazides of the formula:

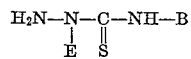

and the condensation products are either allowed to react with amines of the formula:

or first converted in a manner per se known into the S-alkyl-isothiosemicarbazones and these reacted with amines of the formula:

or (c) allowed to react with S-alkyl-isothiosemicarbazides of the formula:

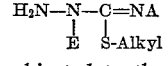

and these products subjected to the action of amines of the formula:

or (d) condensed with hydrazines of the formula:

and the products subsequently reacted with cyanamides of the formula:

or with S-alkyl-isothioureas of the formula:

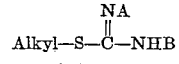

wherein A and E are each hydrogen or a branched, linear or alicyclic alkyl chain of 1–6 carbon atoms, which may be substituted by one or more hydroxyl groups, B is hydrogen, a branched, linear or alicyclic chain of 1–6 carbon atoms, which may be unsubstituted or substituted by one or more hydroxyl groups and which may also be linked to A, as via a hetero atom such as nitrogen, oxygen or sulphur, or a nitro or amino group or a basic radical of the formula D in which D is

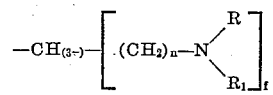

$n$ being an integer of 0–8 and $f$ being 1 or 2, and R and $R_1$ are each hydrogen, the same or different branched, linear or alicyclic alkyl groups of up to 6 carbon atoms, which may be unsubstituted or substituted by one or more hydroxyl groups and which may be linked to one another, as via a hetero atom such as nitrogen, sulphur or oxygen, or (e) steroids which contain one or more keto- or aldehyde-carbonyl groups are converted according to the methods (a) to (d) into the corresponding guanyl-hydrazones which may contain free keto- or aldehyde-carbonyl groups, and subsequently one or more aliphatic, alicyclic, aromatic or heterocyclic radicals with one or more hydroxyl groups, which may also be acylated or etherified, are introduced by methods per se known.

The compounds obtainable according to the invention are cardio-active, i.e. cardio-tonic as such or in the form of their pharmaceutically acceptable salts with non-toxic organic or inorganic acids. Suitable acids are, for example, acetic acid, propionic acid, lactic acid, maleic acid, fumaric acid, succinic acid, tartaric acid, citric acid, salicyclic acid, naphthalene-1,5-disulphonic acid, phosphoric acid, hydrochloric acid, and the like.

Suitable starting materials for the process according to the invention are, for example:

17-(androst-4-ene-3-one)-N-methyl-N-1'-(1'-desoxyglucosyl)-carbamic acid ester,
17-(androst-4-ene-3-one)-N-2'-(2'-desoxyglucosyl)-carbamic acid ester,
17-(androst-4-ene-3-one)-N-1'-(1'-desoxyglucosyl) carbamate,
17-(androst)-4-ene-3-one)-N-1'-(1'-desoxyorbityl) carbamate,
17-(androst-4-ene-3-one))-N-1'-(1'-desoxyarabityl) carbamate,
17-(androst-4-ene-3-one)-N-1'-(1'-desoxyxylityl) carbamate,
3-(androst-5-ene-17-one)-N-methyl-N-1'-(1'-desoxyglucosyl) carbamate,
3-(androst-5-ene-17-one)-N-2'-(2'-desoxyglucosyl) carbamate,
3-(androst-5-ene-17-one)-N-1'-(1'-desoxyglucosyl) carbamate,
3-(androst-5-ene-17-one)-N'-1'-(1'-desoxyarabityl) carbamate,
3-(androst-5-ene-17-one)-N-1'-(1'-desoxyxylityl) carbamate,
20-(pregn-4-ene-3-one)-N-methyl-N'-1'-(1'-desoxyglucosyl) carbamate,
20-(pregn-4-ene-3one)-N-2'-(2'-desoxyglucosyl) carbamate,
20-(pregn-4-ene-3-one)-N-1'-(1'-desoxyglucosyl) carbamate,
20-(pregn-4-ene-3-one)-N1'-(1'-desoxyarabityl) carbamate,
20-(pregn-4-ene-3-one)-N-1'-(1'-desoxyxylityl) carbamate,
3-(pregn-4-ene-20-one)-N-(2,3-dihydroxypropyl) carbamate,
3-(pregn-5-ene-20-one)-N-methyl-N-1'-(1'-desoxyglucosyl) carbamate,
3-(pregn-5-ene-20-one)-N-2'-(2'-desoxyglucosyl) carbamate,
3-pregn-5-ene-20-one)-N-1'-(1'-desoxyglucosyl) carbamate,
3-(pregn-5-ene-20-one)-N-1'-(1'-desoxyarabityl) carbamate,
3-(pregn-5-ene-20-one)-N-1'-(1'-desoxyxylityl) carbamate,
17-(androst-4-ene-3,11-dione)-N-methyl-N-1'-(1'-desoxyglucosyl) carbamate,
17-(androst-4-ene-3,11-dione)-N-2'-(2'-desoxyglucosyl) carbamate,
17-(androst-4-ene-3,11-dione)-N-1'-(1'-desoxyglucosyl) carbamate,
17-(androst-4-ene-3,11-dione)-N-1'-(1'-desoxyarabityl) carbamate,
17-(androst-4-ene-3,11-dione)-N-1'-(1'-desoxyxylityl) carbamate,
21-(pregn-4-ene-3,20-dione)-N-methyl-N-1'-(1'-desoxyglucosyl) carbamate,
21-(pregn-4-ene-3,20-dione)-N-1'-(1'-desoxyglucosyl) carbamate,
21-(pregn-4-ene-3,20-dione)-N-2'-(2'-desoxyglucosyl) carbamate,
21-(pregn-4-ene-3,20-dione)-N-1'-(1'-desoxyarabityl) carbamate,
21-(pregn-4-ene-3,20-dione)-N-1'-(1'-desoxyxylityl) carbamate,
6-(pregn-4-ene-3,20-dione)-N-methyl-N-1'-(1'-desoxyglucosyl) carbamate,
6-(pregn-4-ene-3,20-dione)-N-2'-(2'-desoxyglucosyl) carbamate,
21-(9α-fluoro-11β,17α-dihydroxy-pregn-4-ene-3,20-dione)-N-methyl-N-1'-(1'-desoxyglucosyl) carbamate,
21-(9α-fluoro-11β,17α-dihydroxy-pregn-4-ene-3,20-dione)-N-2'-(2'-desoxyglucosyl) carbamate,
21-(9α-fluoro-11β,17α-dihydroxy-pregn-4-ene-3,20-dione)-N-1'-(1'-desoxyglucosyl) carbamate,
21-(9α-fluoro-11β,17α-dihydroxy-pregn-4-ene-3,20-dione)-N-1'-(1'-desoxyarabityl) carbamate,
21-(9α-fluoro-11β,17α-dihydroxy-pregn-4-ene-3,20-dione)-N-1'-(1'-desoxyxylityl) carbamate,
21-(17α-hydroxy-pregna-1,4-diene-3,11,20-trione)-N-methyl-N-1'-(1'-desoxyglucosyl) carbamate,
21-(11β-17α-dihydroxy-pregna-1,4-diene-3,20-dione)-N-methyl-N-1'-(1'-desoxyglucosyl) carbamate,
21-(17α-hydroxy-pregn-4-ene-3,11,20-trione)-N-methyl-N-1'-(1'-desoxyglucosyl) carbamate,
21-(11β,17α-dihydroxy-pregn-4-ene-3,20-dione)-N-1'-(1'-desoxyglucosyl) carbamate,
21-(17α-hydroxy-pregna-1,4-diene-3,11,20-trione)-N-1'-(1'-desoxyglucosyl) carbamate,
21-(17α-hydroxy-pregna-1,4-diene-3,11,20-trione)-N-2'-(2'-desoxyglucosyl) carbamate,
21-(17α-hydroxy-pregna-1,4-diene-3,11,20-trione)-N-1'-(1'-desoxyarabityl) carbamate,
21-(17α-hydroxy-pregna-1,4-diene-3,11,20-trione)-N-1'-(1'-desoxyxylityl) carbamate,
testosterone-17-(β-D-glucoside),
testosterone-17-(β-D-glucoside-tetra-acetate),
androsterone-3-(β-D-glucoside),
androsterone-3-(β-D-glucoside-tetra-acetate),
desoxycorticosterone-21-(β-D-glucoside),
desoxycorticosterone-21-(β-D-glucoside-tetra-acetate),
16-dehydropregnenolone-3-(D-glucoside-tetra-acetate),
desoxycorticosterone-21-(maltoside-hepta-acetate),
desoxycorticosterone-21-(β-maltoside),
testosterone-17-(β-maltoside-hepta-acetate),
testosterone-17-(β-maltoside),
desoxycorticosterone-21-(2,3,4-triacetyl-D-glucuronic acid methyl ester),
cortisone-21-(2,3,4-triacetyl-D-glucopyrano-syluronic acid methyl ester),
Reichstein's substance S-21-(2,3,4-triacetyl-D-gluccuronic acid methyl ester),
prednisone-21-(2,3,4-triacetyl-D-glucopyranosyluronic acid methyl ester),
hydrocortisone-21-(2,3,4-triacetyl-D-glucuronic acid methyl ester),
dehydro-epiandrosterone-3-(β-D-glucoside-tetra-acetate),
dehydro-epiandrosterone-3-(2,3,4-triacetyl-D-glucuronic acid methyl ester),
testosterone-17-(2,3,4-triacetyl-D-glucuronic acid methyl ester),
pregnenolone-3-(β-D-glucoside-tetra-acetate),
pregnenolone-3-(β-D-glucoside),
progesterone-20-guanyl-hydrazone,
androstene-3,17-dione-17-guanyl-hydrazone,
pregnenolone-20-guanyl-hydrazone,
[3',16]-spiro-Δ¹'-pyrazolidino-3-(β-hydroxyethylimino)-4-androstene-17-one,
3-(β-hydroxyethylimino)-16-acetylthiomethyl-4-androstene-17-one,
3-(β-hydroxyethylimino)-16-(β-hydroxyethylaminomethyl)-4-androstene-17-one,
3-(β-hydroxyethyl)imino-[3',4'-17,16]-Δ⁰'-pyrazolidino-4-pregnene-20-one.

The said compounds are only intended as representative of examples of substances which are suitable starting materials. Moreover, those steroids with OH-containing radicals (see above), which contain one or more keto- or aldehyde-carbonyl groups in any position of the nucleus or in fused lateral chains, are generally suitable starting materials for the invention. The steroids which are used as starting materials can be saturated as well as mono- or poly-unsaturated compounds. With regard to the steric conditions, they may be linked in cis- or trans-form at the rings A, B, B, C and C, D. They may be homo-, nor-, or cyclo-compounds and individual carbon atoms of the sterol system may be replaced by hetero atoms such as nitrogen, oxygen or sulphur. The steroid structure may further be substituted in any way by suitable radicals such as OH, O-alkyl, O-acyl, O-sulphonyl, O-phosphonyl, epoxy, N-NO, O-$NO_2$, $NRR_1$, NO, $NO_2$, CN, halogen, alkyl, alkenyl, alkinyl, acyl, cycloalky, aryl, SH, S-alkyl, S-acyl, COOR, alkyl-COOR, amide, sulphonamide, and the like, or by cyclo-aliphatic, aromatic or heterocyclic rings fused in any position. R and $R_1$ are to be understood as having the above stated meanings.

The invention is illustrated by the following non-limitative examples.

Example 1

1 gram of pregn-5-ene-3β-ol-20-one are dissolved in 200 ml. of benzene and 50 ml. of tetrahydrofuran, phosgene is passed through this solution for 1 hour and the mixture is allowed to stand for 1 hour at room temperature. Air is then passed for 2 hours through the solution which is then evaporated to dryness in a vacuum. The residue is recrystallized from methanol to give 1 gram of pregn-5-ene-20-one-3β-yl-chloroformic acid ester of M.P. 150° C. (decomposition).

This substance is dissolved in 25 ml. acetone and the solution treated with a solution of 1 g. of N-methyl-glucamine in 7 ml. of water. The mixture is heated under reflux for 3 hours, evaporated to dryness in a vacuum, the residue triturated with a little water, and the resultant crystals are filtered off with suction. Reprecipitation from methanol/ether yields 0.7 g. of 3β-(pregn-5-ene-20-one)-N-methyl-N-1'-(1'-desoxyglucosyl) carbamate of M.P. 128° C. (decomposition).

0.5 gram of the 3β-(pregn-5-ene-20-one)-N-methyl-N-1'-(1'-desoxyglucosyl) carbamate are dissolved in 30 ml. of methanol and this solution is treated with a solution of 140 mg. of amino-guanidine bicarbonate in methanolic hydrochloric acid (pH value 2). The mixture is allowed to stand under nitrogen at room temperature for 2 days, stirred into ether, the resultant precipitate is filtered off with suction, boiled several times with acetone and reprecipitated from alcohol/acetone.

Yield: 0.3 gram of the hydrochloride of 3β-(pregn-5-ene - 20 - guanyl-hydrazone)-N-methyl-N-1'-(1'-desoxyglucosyl) carbamate of M.P. 208° C. (decomposition).

Example 2

In a manner analogous to Example 1, there is obtained from 17β - (androst - 4-ene-3-one)-N-methyl-N-1'-(1'-desoxyglucosyl) carbamate, the hydrochloride of 17β-(androst - 4 - ene - 3-guanyl-hydrazone)-N-methyl-1'-(1'-desoxyglucosyl) carbamate of M.P. 164° C. (decomposition).

Example 3

In a manner analogous to Example 1 and starting from androst-5-ene-3β-ol-17-one, there is obtained the androst-5-ene-17-one-3β-yl-chloroformic acid ester of M.P. 108° C. (decomposition), from this, by reaction with N-methyl-glucamine, the 3β-(androst-5-ene-17-one)-N-methyl-N-1'-(1'-desoxyglucosyl) carbamate of M.P. 170° C., and from this, by condensation with aminoguanidine, the hydrochloride of 3β-(androst-5-ene-17-guanyl-hydrazone)-N-methyl-N-1'-(1'-desoxyglucosyl) carbamate of M.P. 254° C. (decomposition).

Example 4

In a manner analogous to Example 1 and starting from pregn-4-ene-20β-ol-3-one, there is obtained the pregn-4-ene-3-one-20β-yl-chloroformic acid ester of M.P. 140° C. (decomposition), from this the 20β-(pregn-4-ene-3-one)-N-methyl-N-1'(1'-desoxyglucosyl) carbamate of M.P. 80–85° C., and from this the hydrochloride of 20β-(pregn-4-ene-3-guanyl-hydrazone)-N-methyl-N-1'-(1' - desoxyglucosyl) carbamate of M.P. 170–172° C. (decomposition).

Example 5

In a manner analogous to Example 1 and starting from pregn-4-ene-21-ol-3,20-dione, there is obtained the pregn-4-ene-3,20-dione-21-yl-chloroformic acid ester of M.P. 160–162° C. (decomposition), and from this the 21-(pregn-4-ene-3,20-dione)-N-methyl-N-1'-(1' - desoxyglucosyl) carbamate of M.P. 82–84° C. (decomposition).

370 milligrams of aminoguanidine bicarbonate are dissolved in methanolic hydrochloric acid until the pH value is 2, and this solution is treated with a solution of 500 mg. of 21-(pregn-4-ene-3,20-dione)-N-methyl-N-1'-(1'-desoxyglucosyl) carbamate in 25 ml. of alcohol. The mixture is stirred under nitrogen at rom temperature for 24 hours, the precipitated crystals are filtered off with suction, boiled with alcohol and rinsed with ether.

Yield: 0.6 gram of dihydrochloride of 21-(pregn-4-ene-3,20-bis-guanyl-hydrazone) - N - methyl-N-1'-(1'-desoxyglucosyl) carbamate of M.P. 212° C. (decomposition).

Example 6

550 milligrams of D-glucamine are dissolved in 40 ml. of methanol, this solution is treated with a solution of 1 g. of pregn-4-ene-3-one-20-guanyl-hydrazone in 20 ml. of benzene, 20 ml. of $CHCl_3$ and 20 ml of ethanol, and heated under reflux for 1 hour. The mixture is then evaporated to dryness in a vacuum and the residue reprecipitated from alcohol/ether.

Yield: 1.5 gram of 3-(1'-desoxy-D-sorbityl-1')-imino-pregn-4-ene-20-guanyl-hydrazone of M.P. 176° C.

Example 7

0.5 gram of 3β-(pregn-5-ene-20-one)N-methyl-1'-(1'-desoxyglucosyl) carbamate are dissolved in 10 ml. of ethanol, this solution is treated with a solution of 250 mg. of 1 - (β-diethyl-amino-ethyl)-3-aminoguanidine hydrochloride in methanolic hydrochloric acid and allowed to stand at room temperature for 24 hours. The mixture is stirred into ether, the precipitated substance is filtered off with suction and boiled several times with acetone.

Yield: 0.4 gram of the dihydrochloride of 3β-[pregn-5-ene - 20 - (β-diethylamino-ethyl-guanyl-hydrazone)]-N-methyl-N-1'-(1'-desoxyglucosyl) carbamate of M.P. 190° C.

Example 8

In a manner analogous to Example 7, there is obtained from 3β - (androst-5-ene-17-one)-N-methyl-N-1'-(1'-desoxyglucosyl) carbamate and 1-(β-diethylaminoethyl)-3-aminoguanidine hydrochloride, the dihydrochloride of 3β-[androst - 5-ene-17 - (β-diethylamino-ethyl-guanyl-hydrazone)]-N-methyl-N-1'-(1'-desoxyglucosyl) carbamate of M.P. 193° C.

Example 9

In a manner analogous to Example 7, there is obtained from 17β - (androst-4-ene-3-one)-N-methyl-N-1'-(1'-desoxyglucosyl) carbamate and 1-(β-diethylaminoethyl)-3-aminoguanidine hydrochloride, the dihydrochloride of 17β-[androst-4-ene-3-(β-diethylaminoethyl - guanyl-hydrazone)]-N-methyl-N-1'-(1'-desoxyglucosyl) carbamate of M.P. 78° C.

Example 10

2 grams of hecogenin are dissolved in 100 ml of dioxane. Dioxane is passed through the solution for 1 hour, the mixture is then allowed to stand at room temperature for 1 hour, air is passed for 2 hours through the solution which is then evaporated to dryness in a vacuum. The solid residue is recrystallized from ethyl acetate, thereby producing 1.6 grams of spirostane-12-one-3β-yl-chloroformic acid ester of M.P. 186° C. (decomposition).

This substance is dissolved in 60 ml. of acetone and the solution treated with 1.3 g. of N-methyl-glucamine. Water is subsequently added, until a clear solution results. The mixture is boiled under reflux for 3 hours, the acetone is removed in a vacuum, the aqueous suspension is cooled and the crystals are filtered off with suction, thereby producing 0.9 gram of 3β-(spirostane-12-one)-N-methyl-N-1′-(1′-desoxyglucosyl) carbamate of M.P. 154° C.

This substance is dissolved in 20 ml. of methanol, the solution treated with a solution of 250 mg. of aminoguanidine bicarbonate in methanolic hydrochloric acid and allowed to stand at room temperature for 3 days. The mixture is stirred into ether, decanted, the viscous residue is dissolved in ethanol and again stirred into ether. The crystals are filtered off with suction and washed with ether, thereby producing 0.5 gram of hydrochloride of 3β-(spirostane-12-guanyl-hydrazone)-N-methyl-N-1′-(1′-desoxyglucosyl) carbamate of M.P. 178° C. (decomposition).

*Example 11*

1 gram of pregn-5-ene-20-one-3β-yl-chloroformic acid ester is dissolved in 40 ml. of acetone, this solution is treated with a solution of 1.15 g. of glucosamine hydrochloride and 210 mg. of sodium hydroxide in 5 ml. of water and heated under reflux for 10 minutes. Part of the acetone is evaporated, the mixture is stirred at room temperature for 1 hour, the precipitate is filtered off with suction and recrystallized from methanol, thereby producing 1.2 grams of 3β-(pregn-5-ene-20-one)-N-2′-(2′-desoxyglucosyl) carbamate of M.P. 205° C. (decomposition).

This substance is dissolved in 25 ml. of methanol, an acidic solution of 350 mg. of aminoguanidine bicarbonate in methanolic hydrochloric acid is added thereto and the mixture is stirred under nitrogen at room temperature for 3 days. The precipitate is filtered off with suction, washed with ethanol and boiled with aceton, thereby producing 1 gram of the hydrochloride of 3β-(pregn-5-ene-20-guanyl-hydrazone)-N-2′-(2′-desoxyglucosyl) carbamate of M.P. 254° C. (decomposition).

*Example 12*

240 milligrams of aminoguanidine bicarbonate are dissolved in methanolic hydrochloric acid until the pH value is 2, this solution is treated with a solution of 0.8 g. of 17β-(androst-4-ene-3-one)-N-2′-(2′-desoxyglucosyl) carbamate in 25 ml. of methanol and allowed to stand at room temperature for 3 days. The mixture is stirred into ether, the precipitated flakes are filtered off with suction, boiled with acetone and reprecipitated from alcohol/acetone, thereby producing 0.5 grams of the hydrochloride of 17β-(androst-4-ene-3-guanyl-hydrazone)-N-2′-(2′-desoxyglucosyl) carbamate of M.P. 246–250° C. (decomposition).

*Example 13*

1 gram of 17β-[D-tetra-acetyl-glucosyloxy]-androst-4-ene-3-one are dissolved in 50 ml. of dry spirits. A methanolic solution of the free aminoguanidine base, prepared from 200 mg. of aminoguanidine hydrochloride and 100 mg. of sodium in 30 ml. of absolute methanol, is added, thereto, and the clear pale-yellow reaction mixture is heated under reflux for 12 hours. After stirring at room temperature for a further 48 hours, the solution is evaporated to dryness in a vacuum, the residue is thoroughly triturated with water and dried in a vacuum. The free base is then dissolved in plenty of ethanol, carefully acidified with methanolic hydrochloric acid and stirred into dry ether. The precipitate is filtered off with suction and washed with ether, thereby producing 0.6 gram of the hydrochloride of 17β-[D-glucosyloxy]-androst-4-ene-3-guanyl-hydrazone, of M.P. 196–203° C.

*Example 14*

In a manner analogous to Example 13, there is obtained from 3β-[D-tetra-acetyl-glucosyloxy]-pregn-5-ene-20-one, the hydrochloride of 3β-[D-glucosyloxy]-pregn-5-ene-20-guanyl-hydrazone of M.P. 277° C. (decomposition).

*Example 15*

In a manner analogous to Example 13, there is obtained from 3β-(D-tetra-acetyl-glucosyloxy)-pregnane-20-one, the hydrochloride of 3β-(D-glucosyloxy)-pregnane-20-guanyl-hydrazone of M.P. 250° C.

*Example 16*

3 grams of 19-nor-testosterone are dissolved in 100 ml. of benzene. Phosgene is slowly conducted through the solution for 1 hour, kept at room temperature for 1 hour, air passed slowly through the solution for 2 hours and the solution evaporated to dryness under vacuum. The residue is crystallized from acetone/water to give 3.2 g. of 19-nor-androst-4-ene-17β-yl-chloroformic acid ester of M.P. 70° C.

1.4 grams of 19-nor-androst-4-ene-17β-yl-chloroformic acid ester is dissolved in 25 ml. of acetone, a solution of 1.6 g. of N-methylglucamine in 2 ml. of water added thereto and heated under reflux for 3 hours. The solution is evaporated to dryness under vacuum, the residue triturated with water, decanted, the viscous oil dissolved in CHCl₃ and dried over Na₂SO₄. After distillation there remains 17β-(19-nor-androst-4-ene-3-one)-N-methyl-N-1′-(1′-desoxyglucoxyl)-carbamate as a colorless powder.

This is dissolved in 20 ml. of methanol without further purification, treated with a solution of 400 mg. of aminoguanidine hydrogen carbonate in methanolic HCl (pH₂) and the reaction solution kept under nitrogen at room temperature for 3 days. Ether is stirred in, the precipitate suction filtered and reprecipitated once from alcohol/ether.

Yield: 1.3 g. of the hydrochloride of 17β-(19-nor-androst-4-ene-3-guanyl-hydrazone)-N-methyl-N-1′-(1′-desoxyglucosyl)-carbamate of M.P. 240° C. with decomposition.

*Example 17*

2.1 grams of 21β-[D-tetraacetylglucosyloxy]-3,20-dioxo-Δ⁴-pregnene are dissolved in 50 ml. of absolute methanol. The methanolic solution of the free aminoguanidine base, prepared from 750 mg. of aminoguanidine hydrochloride and a sodium methylate solution, is added thereto and the light yellow, clear reaction mixture heated for 24 hours under reflux. There is gradually formed a turbid solution which is concentrated to dryness. The solid residue is digested with water, suction filtered and dried under vacuum. The amorphous light yellow substance is dissolved in ethanol/dimethylformamide, the solution acidified with methanolic hydrochloric acid and stirred into ether. The colorless precipitate is suction filtered and boiled several times with ethanol.

Yield: 1.2 g. of the dihydrochloride of 21β-[D-glucosyloxy]-Δ⁴-pregnene-3,20-bisguanylhydrazone of M.P. 240°C. with decomposition.

*Example 18*

2 grams of 17β-[D-tetraacetylglucosyloxy]-androst-4-ene-3-one are dissolved in 50 ml. of absolute methanol and there is added thereto a methanolic solution of 1-[β-pyrrolidino-ethyl]-3-amino-guanidine. The clear reaction mixture is heated under reflux for 24 hours, concentrated to dryness dissolved in absolute methanol and acidified with methanolic hydrochloric acid. By stirring into ether there is precipitated a solid colorless amorphous precipitate which is suction filtered and recrystallized from 1 ml. of dry spirits, thereby producing the dihydrochloride of 17β-[D-glucosyloxy] - androst-4-ene-3-[1-(β-pyrrolidino-ethyl)-guanylhydrazone] of M.P. 178° C.

Example 19

Similarly to Example 18, the dihydrochloride of 3β-[D-glucosyloxy]-pregn-5 - ene - 20 - [1 - (β - pyrrolidino-ethyl)-guanylhydrazone] of M.P. 280° C. with decomposition is obtained from 3β - [D - tetraacetyl-glucosyloxy]-pregn-5-ene-20-one and 1-(β-pyrrolidino-ethyl)-3-amino-guanidine.

Example 20

2.14 grams of 3β-[D-tetraacetyl-glucosyloxy]-pregn-5-ene-20-one are dissolved in 350 ml. of absolute methanol and treated with a solution of 360 mg. of aminoguanidine hydrochloride in 20 ml. of absolute methanol. The pH value of the solution is adjusted to approximately 4.5 with methanolic hydrochloric acid. This is stirred for 24 hours at room temperature. The concentrated methanolic solution is stirred into ether, the suction filtered precipitate triturated twice with water, dried and precipitated from methanol/ether, thereby producing the hydrochloride of 3β-[D-tetraacetyl-glucosyloxy]-pregn-5 - ene-20 - guanyl-hydrazone of M.P. 178° C.

Example 21

Similarly to Example 20, the hydrochloride of 17β-[D - tetraacetyl - glucosyloxy]-androst-4-ene-3-guanylhy-drazone of M.P. 185° C. is obtained from 17β-[D-tetra-acetyl - glucosyloxy] - androst-4-ene-3-one and amino-guanidine hydrochloride.

Example 22

Similarly to Example 20, the dihydrochloride of 21β-[D - tetraacetyl-glucosyloxy]-Δ⁴-pregnene-3,20-bisguanyl-hydrazone of M.P. 240–248° C. is obtained from 21β-[D - tetraacetyl-glucosyloxyl]-Δ⁴-pregnene-3,20-dione and aminoguanidine hydrochloride.

Example 23

2.5 grams of 3β-[D-tetraacetyl-glucosyloxy]-pregn-5-ene-20-one are dissolved in 100 ml. of absolute dimethyl-formamide and 20 ml. of absolute methanol. There is added thereto, with a methanolic sodium methylate solution of pH 4.5, a buffered solution of 1.1 g. of 1-[β-pyr-rolidino-ethyl]-3-amino-guanidine-trihydrochloride in 20 ml. of absolute methanol and stirred for 40 hours at room temperature. The precipitated substance resulting from concentration of the solution is suction filtered and the filtrate stirred into ether. The light yellow crystalline substance is suction filtered, dissolved in methanol, acidified with a little methanolic hydrochloric acid and stirred into ether, thereby producing the trihydrochloride of 3β-[D-tetraacetylglucosyloxy] - pregn - 5-ene-20-[1-(β-pyrroli-dino-ethyl)-guanylhydrazone] of M.P. 195–212° C.

Example 24

Similarly to Example 23, there is obtained the trihy-drochloride of 17β-[D-tetraacetyl-glucosyloxy]-androst-4 - ene - 3-[1-(β-pyrrolidino-ethyl)-guanylhydrazone] of M.P. 182–188° C. from 17β-[D-tetraacetyl-glucosyloxy]-androst-4-ene-3-one and 1-[β-pyrrolidino-ethyl]-3-amino-guanidine-trihydrochloride in absolute methanol.

Example 25

Similarly to Example 23, the hexahydrochloride of 21β - [D - tetraacetyl-glucosyloxy]-Δ⁴-pregnene-3,20-bis-[1-(β-pyrrolidino-ethyl)-guanylhydrazone] of M.P. 200° C. is obtained from 21β-[D-tetraacetyl-glucosyloxy]-Δ⁴-pregnene-3,20-dione and 1-[β-pyrrolidino-ethyl]-3-amino-guanidine-trihydrochloride in methanol.

Example 26

2.2 grams of 21β-[D-tetraacetyl-glucosyloxy]-Δ⁴-preg-nene-3,20-dione are dissolved in 125 ml. of absolute methanol and treated with a methanolic solution of 1-(β-pyrrolidinoethyl)-3-amino-guanidine prepared from 1.9 g. of the corresponding hydrochloride with sodium methylate. After 48 hours heating under reflux the solution is concentrated to dryness, the residue digested with water, suction filtered and dried. It is then placed in absolute dimethylformamide, acidified with methanolic hydrochloric acid and stirred into anhydrous ether. The resulting light yellow crystalline substance is reprecipitated twice from methanol/ether, thereby producing the tetrahydrochloride of 21β-[D-glucosyloxy]-Δ⁴-pregnene-3,20 - bis - [1-(β-pyrrolidinoethyl)-guanylhydrazone] of M.P. 88° C. with decomposition.

Example 27

1.5 grams of 21β-[D-heptaacetyl-maltosyloxy]-Δ⁴- preg-nene-3,20-dione are dissolved in 50 ml. of absolute methanol. A methanolic solution of the free amino-guanidine base, prepared from 400 mg. of aminoguanidine hydrochloride and a sodium methylate solution, is added thereto and the clear reaction solution heated under reflux for 18 hours. The eventually turbid solution is concentrated to dryness, digested with water, dried, dissolved in absolute dimethylformamide, acidified with methanolic hydrochloric acid and stirred into anhydrous ether, thereby producing the dihydrochloride of 21β-[D-mal-tosyloxy]-Δ⁴-pregnene-3,20-bisguanylhydrazone of M.P. 217° C.

Example 28

1.5 grams of 21β-[D-heptaacetyl-maltosyloxy]-Δ⁴-preg-nene-3,20-dione are dissolved in 75 ml. of absolute methanol and there is added thereto 400 mg. of amino-guanidine hydrochloride in 25 ml. of absolute methanol. The pH value of the reaction solution is adjusted by means of 2 drops of methanolic hydrochloric acid to pH 4.5. It is stirred at room temperature for 40 hours, then mixed into anhydrous ether, the precipitate suction filtered, digested twice with water and dried, thereby producing the dihydrochloride of 21β-[D-heptaacetyl-mal-tosyloxy]-Δ⁴-pregnene-3,20-bisguanylhydrazone of M.P. 180° C. with decomposition.

Example 29

In a manner similar to Example 5, there is obtained from 21 - (pregn - 4-ene-3,20-dione)-N-methyl-N-1'-(1'-desoxyglucosyl) - carbamate and 1,2 - ethylene-3-amino-guanidinehydrobromide the dihydrobromide of 21-[pregn-4 - ene - 3,20 - bis - (1,2-ethyleneguanylhydrazone)]-N-methyl-N-1'-(1'-desoxyglucosyl)-carbamate of M.P. 152° C. (decomposition).

In an analogous manner there are obtained: the dihydrochloride of 21-[pregn - 4 - ene - 3,20 - bis-(1-methyl-guanylhydrazone)] - N-methyl-N-1'-(1'-desoxyglucosyl)-carbamate, M.P. 173–175° C. (decomposition) and the 21-[pregn - 4 - ene-3,20-bis-(nitroguanylhydrazone)]-N-methyl-N-1'-(1'-desoxyglucosyl)-carbamate of M.P. 123° (decomposition).

Example 30

In a manner analogous to Example 5, there is obtained from 21-(pregn - 4 - ene-3,11,20-trione)-N-methyl-N-1'-(1'-desoxyglucosyl)-carbamate and aminoguanidine-hy-drochloride the dihydrochloride of 21-(pregn-4-ene-11-one - 3,20 - bis - guanylhydrazone)-N-methyl-1'-(1'-de-soxyglucosyl)-carbamate of M.P. 223° C. (decomposition).

What is claimed is:
1. A compound selected from the group consisting of the mono- and bis-guanylhydrazone, the mono- and bis-[(β-diethylaminoethyl)-guanylhydrazone] and the mono- and bis-[(β-pyrrolidinoethyl)-guanylhydrazone] of an-drostanes and pregnanes which contain one N-methyl-N-1'-(1'-desoxyglucosyl)-carbamate or N-2'-(2'-desoxyglu-cosyl)-carbamate or (D-glucosyloxy)- or (D-tetraacetyl-glucosyloxy)- or (D-maltosyloxy)- or (D-heptaacetyl-maltosyloxy)- group on carbon atom 3, 17, 20 or 21, and their pharmaceutically acceptable non-toxic acid salts.

2. The hydrochloride of 3β-(pregn-5-ene-20-guanyl-hydrazone) - N - methyl - N - 1' - (1' - desoxyglucosyl) carbamate.

3. The hydrochloride of 17β-(androst-4-ene-3-guanyl-hydrazone) - N - methyl - 1' - (1' - desoxyglucosyl) carbamate.

4. The hydrochloride of 3β-(androst-5-ene-17-guanyl-hydrazone) - N - methyl - N - 1' - (1' - desoxyglucosyl) carbamate.

5. The hydrochloride of 20β-(pregn-4-ene-3-guanyl-hydrazone) - N - methyl - N - 1' - (1'-desoxyglucosyl) carbamate.

6. The dihydrochloride of 21-(pregn-4-ene-3,20-bis-guanyl - hydrazone) - N - methyl - N - 1' - (1' - desoxyglucosyl) carbamate.

7. The compound 3-(1'-desoxy-D-sorbityl-1')-imino-pregn-4-ene-20-guanyl-hydrazone.

8. The dihydrochloride of 3β-[pregn-5-ene 20-(β-diethylamino - ethyl - guanyl - hydrazone)] - N - 1' - (1'-desoxyglucosyl) carbamate.

9. The dihydrochloride of 3β-[androst-5-ene-17-(β-diethylamino - ethyl - guanyl - hydrazone)] - N - methyl-N-1'-(1'-desoxyglucosyl) carbamate.

10. The dihydrochloride of 17β-[androst-4-ene-3-(β-diethylamino - ethyl - guanyl - hydrazone)] - N - methyl-N-1'-(1'-desoxyglucosyl) carbamate.

11. The hydrochloride of 3β-(spirostane-12-guanyl-hydrazone) - N - methyl - N - 1' - (1' - desoxyglucosyl) carbamate.

12. The hydrochloride of 3β-(pregn-5-ene-20-guanyl-hydrazone) - N - 2' - (2' - desoxyglucosyl) carbamate.

13. The hydrochloride of 17β-(androst-4-ene-3-guanyl-hydrazone) - N - 2' - (2' - desoxyglucosyl) carbamate.

14. The hydrochloride of 17β-[D-glucosyloxy]-androst-4-ene-3-guanyl-hydrazone.

15. The hydrochloride of 3β-[D-glucosyloxy]-pregn-5-ene-20-guanyl-hydrazone.

16. The hydrochloride of 3β-(D-glucosyloxy)-pregnane-20-guanyl-hydrazone.

17. The hydrochloride of 17β-(19-nor-androst-4-ene-3-guanyl - hydrazone) - N - methyl - N - 1' - (1' - desoxy-glucosyl) carbamate.

18. The dihydrochloride of 21β-[D-glucosyloxy]-Δ⁴-pregnene-3,20-bisguanylhydrazone.

19. The dihydrochloride of 17β-[D-glucosyloxy]-androst - 4 - ene - 3 - [1 - (β-pyrrolidino-ethyl)-guanylhydrazone].

20. The dihydrochloride of 3β-[D-glucosyloxy]-pregn-5 - ene - 20 - [1 - (β - pyrrolidino - ethyl) - guanyl - hydrazone].

21. The hydrochloride of 3β-[D-tetra-acetyl-glucosyloxy]-pregn-5-ene-20-guanyl-hydrazone.

22. The hydrochloride of 17β-[D-tetra-acetyl-glucosyloxy]-androst-4-ene-3-guanylhydrazone.

23. The dihydrochloride of 21β-[D-tetra-acetyl-glucosyloxy] - Δ⁴ - pregnene - 3,20 - bisguanylhydrazone.

24. The trihydrochloride of 3β-[D-tetra-acetyl-glucosyloxy] - pregn - 5 - ene - 20 - [1 - (β - pyrrolidino-ethyl)-guanylhydrazone].

25. The trihydrochloride of 17β-[D-tetra-acetyl-glucosyloxy] - androst - 4 - ene - 3 - [1 - (β - pyrrolidino-ethyl)-guanylhydrazone].

26. The hexahydrochloride of 21β-[D-tetra-acetyl-glucosyloxy] - Δ⁴ - pregnene - 3,20 - bis - [1 - (β - pyrrolidino-ethyl)-guanylhydrazone].

27. The tetrahydrochloride of 21β-[D-glucosyloxy]-Δ⁴ - pregnene - 3,20 - bis - [1 - (β - pyrrolidino - ethyl)-guanylhydrazone].

28. The dihydrochloride of 21β-[D-maltosyloxy]-Δ⁴-pregnene-3,20-bisguanylhydrazone.

29. The dihydrochloride of 21β-[D-hepta-acetyl-maltosyloxy]-Δ⁴-pregnene-3,20-bisguanylhydrazone.

References Cited
FOREIGN PATENTS
1,175,228   8/1964   Germany.

OTHER REFERENCES
Barnett et al.: "Bio. Chem. Journal," vol. 40, 1946, pp. 450–453.

Pesez et al.: "Bull. Soc. Chem.," 1958, pp. 488–490.

LEWIS GOTTS, *Primary Examiner.*

JOHNNIE R. BROWN, *Assistant Examiner.*